(12) United States Patent  (10) Patent No.: US 8,578,278 B2
Rauh et al.  (45) Date of Patent: Nov. 5, 2013

(54) DYNAMIC USER INTERFACE CONTENT ADAPTATION AND AGGREGATION

(75) Inventors: Alexander Rauh, Weinheim (DE); Lars Erbe, Stutensee (DE); Thomas Gieselmann, Hockenheim (DE); Franz Mueller, Stutensee (DE); Sri Vidhyaan, Bangalore (DE); Nina Tabitha Paul, Bangalore (DE); Stefan Haffner, Hockenheim (DE); Vibhor Tomar, Bangalore (IN); Holger Schmidt, Sinsheim (DE)

(73) Assignee: SAP AG, Walldorf (DE)

( * ) Notice: Subject to any disclaimer, the term of this patent is extended or adjusted under 35 U.S.C. 154(b) by 265 days.

(21) Appl. No.: 12/976,868

(22) Filed: Dec. 22, 2010

(65) Prior Publication Data

US 2012/0166976 A1  Jun. 28, 2012

(51) Int. Cl.
*G06F 3/00*  (2006.01)

(52) U.S. Cl.
USPC ........... 715/744; 715/762; 715/741; 715/742; 715/743

(58) Field of Classification Search
USPC .......................................... 715/762, 741–744
See application file for complete search history.

(56) References Cited

U.S. PATENT DOCUMENTS

| | | | |
|---|---|---|---|
| 7,620,894 B1* | 11/2009 | Kahn | 715/707 |
| 7,870,125 B1* | 1/2011 | Istvan et al. | 707/722 |
| 2002/0124053 A1* | 9/2002 | Adams et al. | 709/216 |
| 2003/0088824 A1* | 5/2003 | Ayan | 715/500 |
| 2003/0101412 A1* | 5/2003 | Eid | 715/513 |
| 2003/0120593 A1* | 6/2003 | Bansal et al. | 705/39 |
| 2003/0229623 A1* | 12/2003 | Chang et al. | 707/3 |
| 2004/0230947 A1* | 11/2004 | Bales et al. | 717/110 |
| 2005/0187895 A1* | 8/2005 | Paya et al. | 707/1 |
| 2005/0198201 A1* | 9/2005 | Bohn et al. | 709/218 |
| 2006/0059564 A1* | 3/2006 | Tan et al. | 726/27 |
| 2006/0161635 A1* | 7/2006 | Lamkin et al. | 709/217 |
| 2006/0276916 A1* | 12/2006 | Dearing et al. | 700/79 |
| 2006/0288301 A1* | 12/2006 | Hood et al. | 715/762 |
| 2007/0233685 A1* | 10/2007 | Burns et al. | 707/9 |
| 2007/0239573 A1* | 10/2007 | Tien et al. | 705/35 |
| 2007/0255681 A1* | 11/2007 | Tien et al. | 707/2 |
| 2007/0265863 A1* | 11/2007 | Tien et al. | 705/1 |
| 2007/0266051 A1* | 11/2007 | Moore | 707/200 |
| 2008/0148150 A1* | 6/2008 | Mall | 715/707 |
| 2008/0244517 A1* | 10/2008 | Rostoker | 717/120 |
| 2008/0270948 A1* | 10/2008 | Lazzaro et al. | 715/854 |
| 2009/0024585 A1* | 1/2009 | Back et al. | 707/3 |
| 2009/0083643 A1* | 3/2009 | Beringer | 715/762 |
| 2009/0099867 A1* | 4/2009 | Newman | 705/2 |
| 2009/0108064 A1* | 4/2009 | Fernandes et al. | 235/380 |
| 2009/0150806 A1* | 6/2009 | Evje et al. | 715/762 |
| 2009/0164447 A1* | 6/2009 | Daya | 707/5 |
| 2010/0075751 A1* | 3/2010 | Garvey et al. | 463/30 |
| 2010/0161676 A1* | 6/2010 | Kazmaier et al. | 707/802 |
| 2011/0277027 A1* | 11/2011 | Hayton et al. | 726/8 |

* cited by examiner

*Primary Examiner* — Tuyetlien Tran
(74) *Attorney, Agent, or Firm* — Mintz Levin Cohn Ferris Glovsky and Popeo, P.C.

(57) ABSTRACT

Upon receiving a request for a user interface view from a user interface, a user identity and a user authorization class for a user of the user interface can be checked against a user registry and an authorization class registry, respectively. A user interface view component can be retrieved according to the user identity and the user authorization class. The user interface view can be generated by aggregating the retrieved user interface view component with at least one other user interface view component consistent with the user identity and user authorization class, and the generated user interface view can be returned for display to the user via the user interface. Related systems, articles of manufacture, and computer-implemented methods are described.

18 Claims, 10 Drawing Sheets

DYNAMIC USER INTERFACE CONTENT ADAPTATION AND AGGREGATION

The current applicant is related to co-pending and co-owned application Ser. No. 12/976,968, filed on Dec. 22, 2010 and entitled "Metadata Container-Based User Interface Flexibility" and 12/976,877, filed on Dec. 22, 2010 and entitled "Dynamic Determination of Navigation Targets in a Flexible User Interface Environment," the disclosures of which are each incorporated by reference.

TECHNICAL FIELD

The subject matter described herein relates to dynamic content adaptation and aggregation for user interface flexibility.

BACKGROUND

Various organizations make use of enterprise resource planning (ERP) software architectures to provide an integrated, computer-based system for management of internal and external resources, such as for example tangible assets, financial resources, materials, customer relationships, and human resources. In general, ERP software architectures are designed to facilitate the flow of information between business functions inside the boundaries of the organization and manage the connections to outside service providers, stakeholders, and the like. Such architectures often include one or more centralized databases accessible by a core software platform that consolidates business operations, including but not limited to those provided by third party vendors, into a uniform and organization-wide system environment. The core software platform can reside on a centralized server or alternatively be distributed across modular hardware and software units that provide "services" and communicate on a local area network or over a network, such as for example the Internet, a wide area network, a local area network, or the like.

As part of the installation process of the core software platform on computing hardware owned or operated by the organization, one or more customized features, configurations, business processes, or the like may be added to the default, preprogrammed features such that the core software platform is configured for maximum compatibility with the organization's business processes, data, and the like. The customized version of the core software platform presented to users at to an organization can therefore differ from the customized versions presented to users at other organizations. Additionally, within an organization, different subsets of users may need access to different sets of features. Customization of user interface environments to meet this variety of user needs can be cumbersome and time consuming.

The core software platform of an ERP or other software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. Large organizations can generally justify the expense of tasking one or more programmers and user interface architects to design customized, hard coded user interface features to provide appropriate functionality to each of one or more classes of users.

SUMMARY

In one aspect, a method includes receiving a request from a user interface view from a user interface, checking a user identity and a user authorization class for a user of the user interface against a user registry and an authorization class registry, respectively, and retrieving a user interface view component according to the user identity and the user authorization class. The user interface view is generated by aggregating the retrieved user interface view component with at least one other user interface view component consistent with the user identity and user authorization class, and the user interface view is returned for display to the user.

In optional variations, one or more of the following features can also be included. The retrieving of the user interface view component can include accessing an assignment for a system scoping element from a scope persistency. The scoping assignment can include a designation of at least one business content type corresponding to a given scope element. The at least one business content type can be selected from a process component, a business process variant type, a business object, and a business feature. An individual load variant of a user interface model can be analyzed during retrieval of metadata associated with answering of the request. The user interface view component can include at least one of an application view component defined by a specific application as a static user interface model and a generic view component that adapts its metadata based on at least one other available view component. The request for the user interface view can occur automatically in response to a detection of a content change. The content change can include at least one of installation of a new software version and addition of a new software feature, hot fix, or upgrade of an existing software version that requires at least one of a regeneration of the user authorization class, an adaptation of a scoping decision, and an adaptation of an existing user assignment.

The user interface can be provided to the user via a client tenant of a multi-tenant system comprising an application server providing access for each of a plurality of organizations to one of a plurality of client tenants. Each of the plurality of client tenants can include a customizable, organization-specific version of a core software platform that also integrates business functionality provided by at least one external software provider. The data repository can include core software platform content relating to the operation of the core software platform and that is common to all of the plurality of client tenants, system content having a system content format defined by the core software platform and containing system content data that are unique to specific client tenants of the plurality of client tenants, and tenant-specific content items whose tenant-specific content formats and tenant-specific content data are defined by and available to only one of the plurality of client tenants. A cache key corresponding to a current user interface view active at the user interface and specifying the user identity and at least one of an assigned work center view of the user, a user interface model metadata state, and business configuration state can be retrieved and compared to a user interface framework status and user access registry that include current user interface state information for the core software platform, an external service provider, and tenant-specific content metadata associated with the customized version of the core software platform provided to the user by the client tenant.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

It should be noted that, while the descriptions of specific implementations of the current subject matter discuss delivery of enterprise resource planning software to multiple organizations via a multi-tenant system, the current subject matter is applicable to other types of software and data services access as well.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Smaller organizations can also benefit from use of functionality provided by ERP or other integrated software architectures. However, such an organization may lack the necessary hardware resources, IT support, and/or consulting budget necessary to make use of a standalone software architecture product and can in some cases be more effectively served by a software as a service (SaaS) arrangement in which the system architecture is hosted on computing hardware such as servers and data repositories that are maintained remotely from the organization's location and accessed by authorized users at the organization via a thin client, such as for example a web browser, over a network. Creation of customized user interface functionality for smaller organizations, for example by hard-coding of user interfaces for each of one or more classes of users, can add significantly to the total cost of ownership. Such services could be provided by the SaaS provider, but this approach can be similarly inefficient and can also require ongoing maintenance and updating services to reflect new functionality provided either by the SaaS provider or by a third party application from an external service provider that is integrated into the customized core software platform.

Additionally, a statically defined user interface model can fail to cover all possible user interface configurations that might need to be provided via a customized implementation of a software architecture, such as for example an enterprise resource planning architecture provided via a multi-tenancy architecture. In such a use environment, user interface metadata may need to be adapted based on authorizations or permissions, scoping of the application or applications, organizational assignments, business data, and the like.

To address these and potentially other issues with currently available solutions, one or more implementations of the current subject matter provide methods, systems, articles or manufacture, and the like that can, among other possible advantages, provide dynamic adaptation of a user interface based on content type.

In some implementations, dynamic adaptation of metadata can be based on scoping of applications and application features, for example according to user assignments or the organization to which a user belongs, exit classes based on content interpreted for multiple role codes and business data, scoping-based user interface adaptations based on business rules, and the like. Adaptations can also be based on subtype and/or role codes. For example, content-based determination of one or more role codes that define the run time behavior can be determined for a user and applied to extract and present a customized user interface with appropriate content and functionality for the specific user. Adaptation in individual scenarios can in some examples be performed using a service map. Extracting of data and checks can be done at design time to reduce run time issues and to increase the quality of dynamically created and aggregated user interfaces and runtime optimization.

The metadata of a dynamic component of a user interface can be adapted during retrieval of a dynamic component from the backend. Various mechanisms can be introduced to cover retrieval scenarios. For example, metadata adaptation in post process content can occur as follows. After retrieval of user interface metadata, for example from storage in a navigation repository or other feature of a backend architecture, the user interface metadata can be adapted depending on a type of user interface model (e.g. a work center, a view, or the like) to be presented. The adaptation can include features such as, for example, replacing the texts displayed on the user interface with translated texts corresponding to a language. User interface models can in some implementations be stored only in a master language.

Metadata can be adapted as part of a dynamic extension for a specific role code. For example, a metadata adaptation mechanism can be launched based on a role code determined for a specific user interface component. The metadata adaptation mechanism can be registered for a specific role code. In one illustrative implementation, a quick link user interface component can be detected according to one or more criteria. A quick link role code can then be set. A special adaptation handling can be registered for the quick link role code. Such a quick link list can include all or at least some quick links that are exposed by object work lists (OWLs) or the like that are part of the views of the current work center.

Adaptation for a user interface component can be performed via a load variant to cover individual adaptations based on business data. An individual load variant can be added to a user interface model and can be analyzed during metadata retrieval. A registered class for the load variant can adapt the metadata based on a well defined interface. One example use case of this kind of functionality can include a user interface service map that reacts based on sets of authorized business data (for example for hiding of services).

Each user interface model and its associated metadata can be analyzed when the model is saved, for example to provide a performance optimized basis for dynamic adaptations during runtime and a basis for metadata analyses, such as for example semantic services, that are used also for adaptations and the generic user interface components/views. Consistency of the model and metadata can be verified. Runtime optimized formats (e.g. index tables, references) relating to the models and/or how they are stored can be identified and/or created. The analysis and extraction/optimization of the metadata can be based on a categorization, for example according to component type, role code, load variant, etc.

Application views can be defined by a specific application, generally as a static user interface model. Generic view components, such as for example overviews, report views, work views, and the like are capable of adapting their metadata based on the available views. Each user interface component can react based on one or more scoping decisions. In some specific cases it can be required that individual components react on dynamic use cases and/or business data (example service map).

A root model that combines all user-assigned work centers can be adapted by the root provider at runtime based on the type (e.g. the root), the assignments (e.g. the identity of the user) and the scoping decisions. A work center can be adapted in a similar manner by the work center provider. In an illustrative example, a component provider can adapt user interface components based on registered and user assigned navigation targets. A common tasks area of a view provider can be adapted by a view model based on the available navigation targets.

A work center for a business area can provide features and functions related to a specific business process or scenario, such as for example logistics, sales orders, special tasks, or the like, and can include one more screens. In some implementations, a succession of screens can include increasing levels of detail around a chosen topic, sub-topic, item, service, etc. A metadata object can be flexibly assigned to users based on permissions, for example using a metadata container concept.

Determination of active user interface entities can occur via activation of a relevant entity in the development system, import of a transport from the development system in any tenant of a target system, a change of the solution scope on any tenant, or the like. The scoping layer can be accessed via one or more application programming interfaces (APIs) that ensure that the scoping layer is used. A design time API can include an import parameter, for example in its signature that can direct the API to access the virtual layer of the current user or, if the API is tasked for scoping, to access the scoping layer.

A pre-defined load variant parameter, for example included in the header of a user interface component, can define which exceptional adaptation should be executed for a given load variant during run time. Available load variant parameters can be stored, for example in an s-table, and exposed to the user interface designer. The load variant parameter can also define which special adaptation (e.g. exposing of specific data) should be executed for a current user interface component.

Special metadata of the current user interface component can be exposed in some implementations, for example as default sets of an OWL.

On a user interface component level, one or more load rules can be defined. These load rules can be analyzed by a load analysis method to determine necessary adaptations of user interface coding, for example in the XML language. In addition to the adaptations identified via a load variant parameter, some adaptations can be executed directly at run time, such as for example navigation replacement.

Dynamic content determinations can be updated or otherwise modified after a content change, such a for example a new software version, addition of new features, hot fixes or other upgrades or updates of an existing version, or the like that is relevant for regeneration of authorizations, adapting of scoping decisions and existing user assignments, and the like. These types of changes can influence the available user interface elements and also the authorizations of an end user via the authorization-relevant metadata of the assigned UI elements. It can be advantageous for existing user assignments to be adjusted automatically and/or without manual interaction and without the regeneration of the complete content.

Event based propagation of content changes can be provided in which determination of a resulting set of changed user interfaces and authorizations can be calculated. A new authorization of relevant metadata based on the changed components can be determined and activated dynamically using a determination algorithm that makes the appropriate determination of a proper user interface scope to provide based on authorization rules and metadata.

Figure 1:
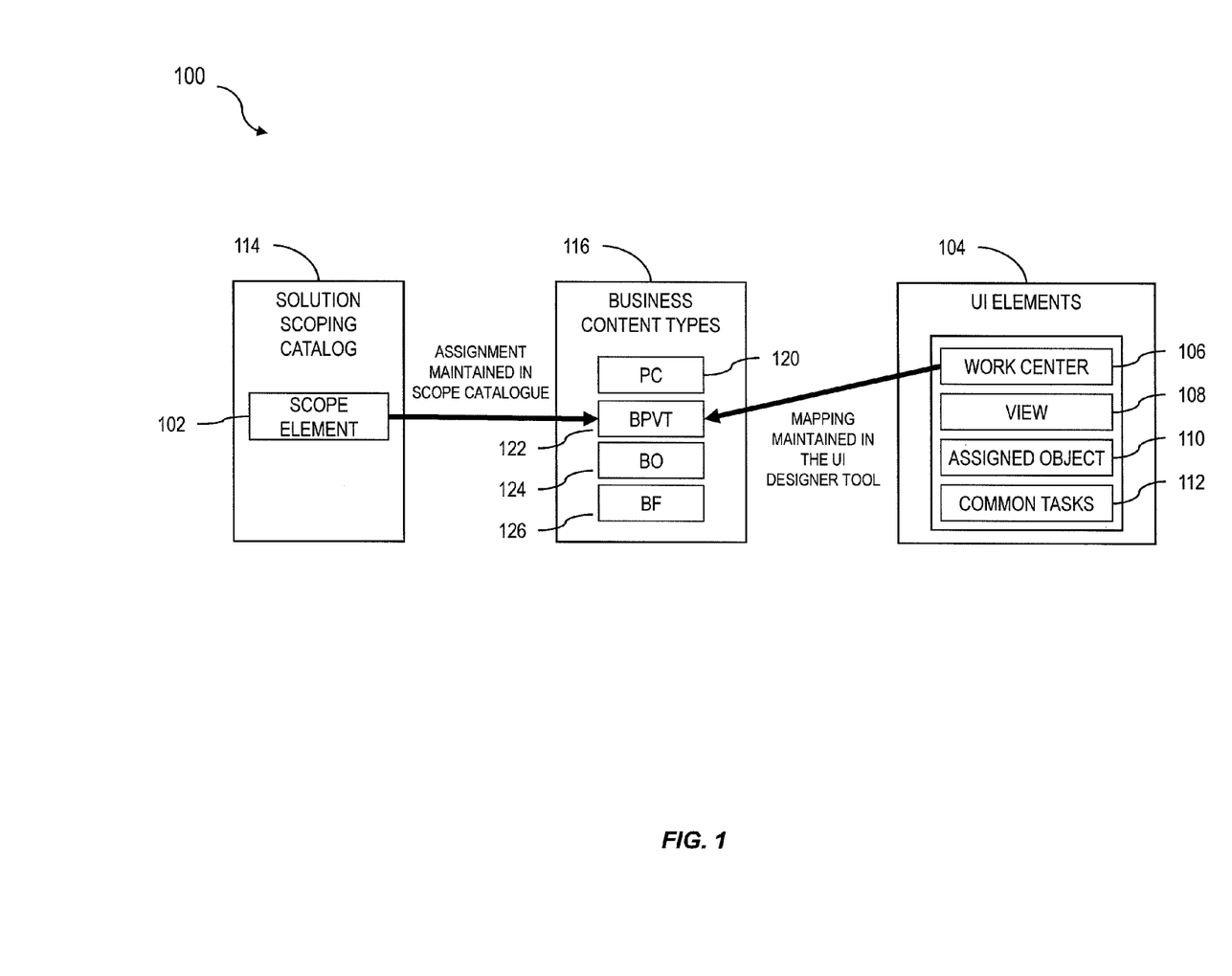
FIG. 1 is a diagram illustrating mapping between scope assignments and user interface elements.

FIG. 1 shows a mapping between a solution scope element 102 and available user interface elements 104, which can include, but are not limited to, work centers 106, views 108, and assigned objects 110, common tasks 112, and the like. An assignment for a system scoping element 102 can be maintained in a scope persistency, such as for example a scoping catalog 114 for a given software solution (e.g. an application, software component, or the like). The scoping assignment can include a designation of one or more business content types 116, which can include process components (PC) 120, business process variant types (BPVT) 122, business objects 124, business features (BF) 126, and the like, corresponding to a given scope element 102. Mapping of one or more user interface elements to a business content type 116 can be accomplished via a mapping determined in a user interface designer tool.

Figure 2:
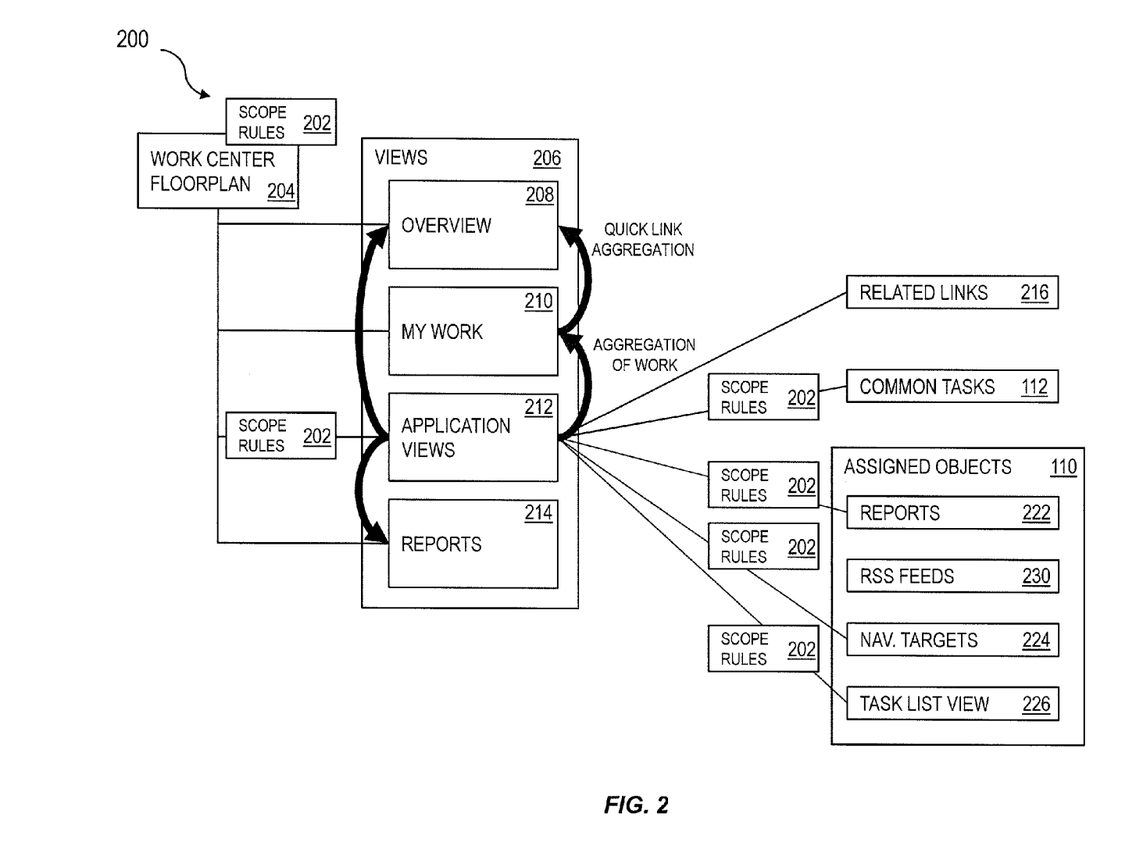
FIG. 2 is a diagram illustrating a structure of metadata containers underlying views.

Some implementations of the current subject matter can be used in conjunction with a work center concept that creates a work center view based on existing application views, generic views, or the like, for example as described in co-owned and co-pending U.S. patent application Ser. No. 12/976,968 "Metadata Container-Based User Interface Flexibility"]. FIG. 2 is a box diagram 200 illustrating methods and levels on which level scope rules 202 defining scope dependencies can influence the delivery of user interface components. A work center floor plan 204 can be created from a combination of one or more views 206. Views 204 can include, but are not limited to, an overview view 208, a "my work" view 210, a work center-specific view 212, reports 214, and the like. Some representative examples of work center-specific views can include related links 216, common tasks 112, and assigned objects 110. Some example of assigned objects 112 that can depend on scoping can include reports 222, navigation targets 224, task list views 226, and the like. Really simply syndication (RSS) feeds 230 can also be assigned objects. However, RSS 230 feeds may in some implementations not depend on scoping.

In a software delivery configuration in which services provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Such an approach can introduce several challenges. Making modifications to the core software platform, for example updating to a new version, implementing a change to the core functionality, or the like, can become a complicated and unpredictable process if each tenant's customized data objects and other tenant-specific configurations do not react in the same manner to the modifications. Additionally, during a lifecycle management event, such as for example an upgrade or update, many application specific tasks may have to be executed in a multi-tenant system. One or more of these actions have to run on every business tenant that exists in the multi-tenant system. However, to start a task on a specific tenant, a user logon with password can be necessary, thereby requiring that the lifecycle management procedure have ready access to authentication information, such as for example user names and passwords, for each tenant. Such a requirement can create numerous disadvantages, including but not limited to security concerns, logistical difficulties pertaining to maintaining a current listing of authentication information for numerous tenants, and the like.

To address these and potentially other issues, one or more implementations of the current subject matter provide methods, systems, articles or manufacture, and the like that can, among other possible advantages, provide improved and streamlined procedures for enacting changes, updates, and the like to multi-tenant software delivery architectures.

Figure 3:
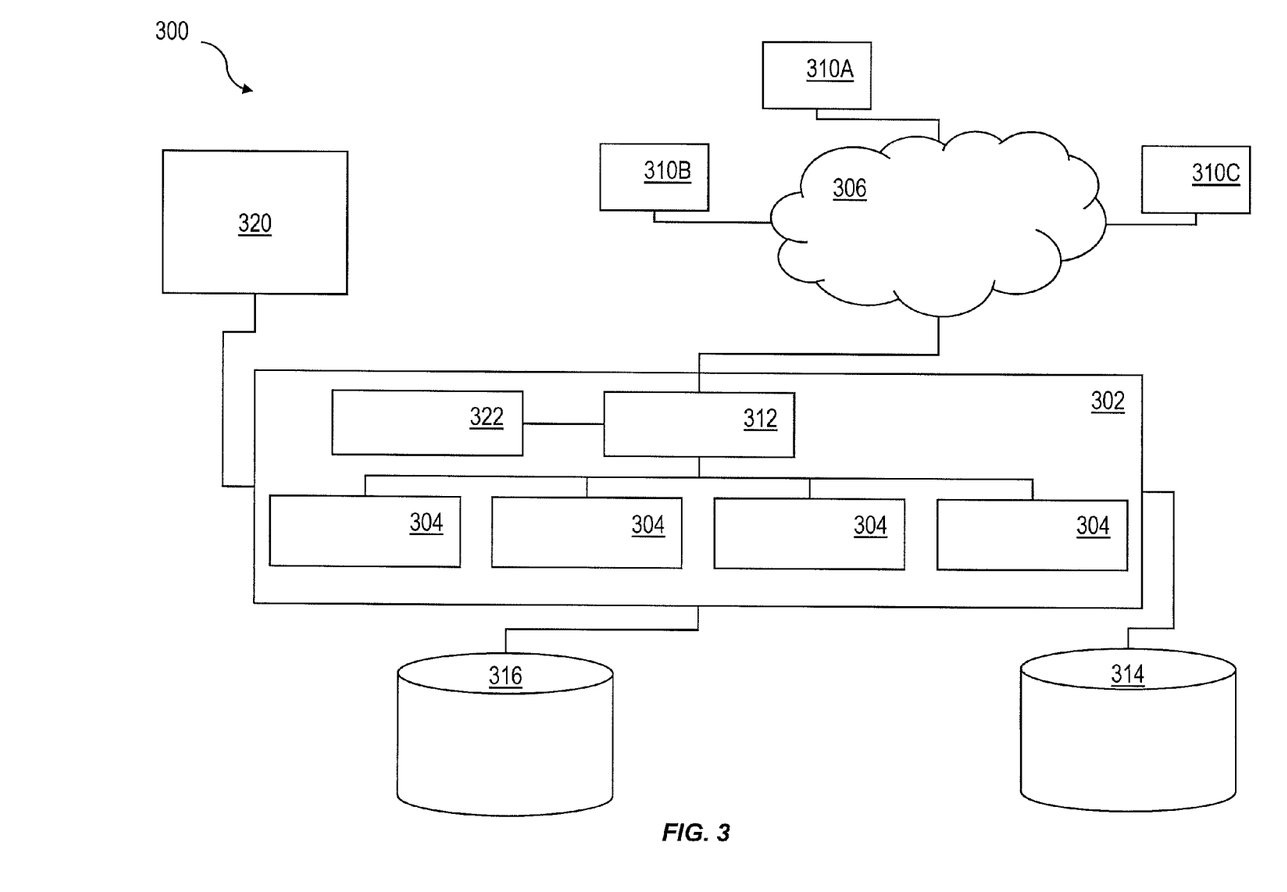
FIG. 3 is a diagram illustrating features of a multi-tenant architecture for providing customized software services to multiple organizations from a single architecture.

FIG. 3 shows a block diagram of a multi-tenant implementation of a software delivery architecture 300 that includes an application server 302, which can in some implementations include multiple server systems 304 that are accessible over a network 306 from client machines operated by users at each of multiple organizations 310A-310C (referred to herein as "tenant users" of a multi-tenant system) supported by a single software delivery architecture 300. For a system in which the application server 302 includes multiple server systems 304, the application server can include a load balancer 312 to distribute requests and actions from tenant users at the one or more organizations 310A-310C to the one or more server systems 304. A user can access the software delivery architecture across the network using a thin client, such as for example a web browser or the like, or other portal software running on a client machine. The application server 302 can access data and data objects stored in one or more data repositories 314. One or more metadata repositories 316 can store metadata including, but not limited to, a set of autonomous user interface metadata containers and work center and view assignments and navigation. The application server 302 can also serve as a middleware component via which access is provided to one or more external software components 320 that can be provided by third party developers. A user interface content generator 322 can dynamically provide user interface content, for example according to one or more of the approaches described herein.

Figure 4:
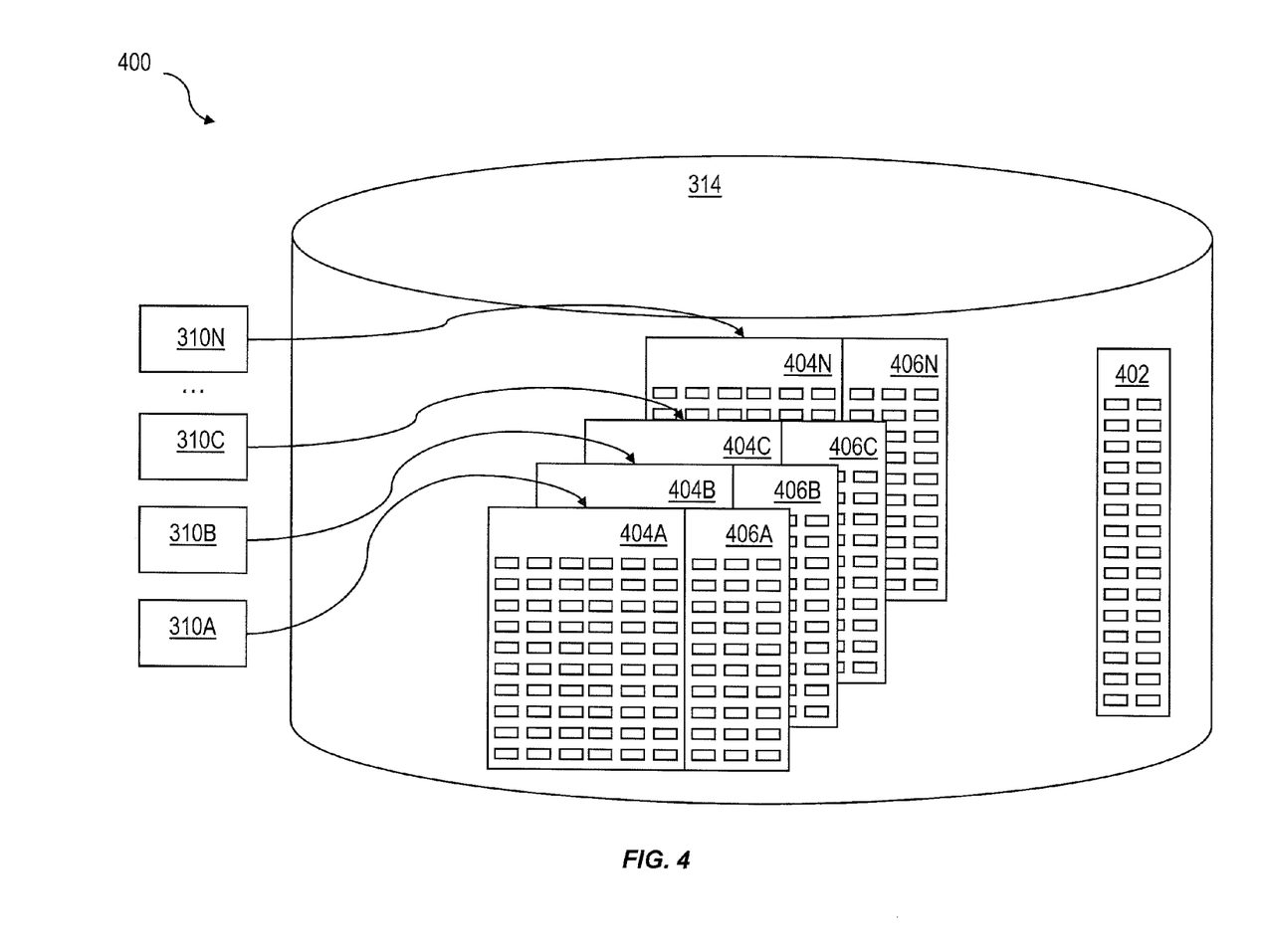
FIG. 4 is a diagram illustrating an example of storage of core software package data objects and tenant-specific data objects for each of multiple tenants of a multi-tenant system.

To provide for customization of the core software platform for tenant users at each of multiple organizations 310A-310C supported by a single software delivery architecture 300, the data and data objects stored in the repository or repositories 314 that are accessed by the application server 402 can include three types of content as shown in FIG. 4: core software platform content 402, system content 404, and tenant content 406. Core software platform content 402 includes content that represents core functionality and is not modifiable by tenant users. System content 404 can in some examples be created by the runtime of the core software platform and can include core data objects that are modifiable with data provided to tenant users at each organization 310A-310N. For example, if the core software platform is an ERP system that includes inventory tracking functionality, the system content 404A-404N can include data objects for labeling and quantifying inventory. The data retained in these data objects are tenant-specific: for example, data in the repository that are isolated to tenant users or each organization 310A-310N includes information about its own inventory. Tenant content 406A-406N includes data objects or extensions to other data objects that are customized for tenant users of one specific organization 310A-310N to reflect business processes and data that are specific to that specific organization's tenant users and are accessible only to authorized tenant users at the corresponding organization. Such data objects can include a key field (for example "client" in the case of inventory tracking) as well as one or more of master data, business configuration information, transaction data or the like. For example, tenant content 406 can include condition records in generated condition tables, access sequences, price calculation results, or any other tenant-specific values. A combination of the software platform content 402 and system content 404 and tenant content 406 of a specific organization are presented to the appropriate tenant such that each tenant provides access to a customized solution whose data are available only to tenant users from the corresponding organization.

Figure 5:
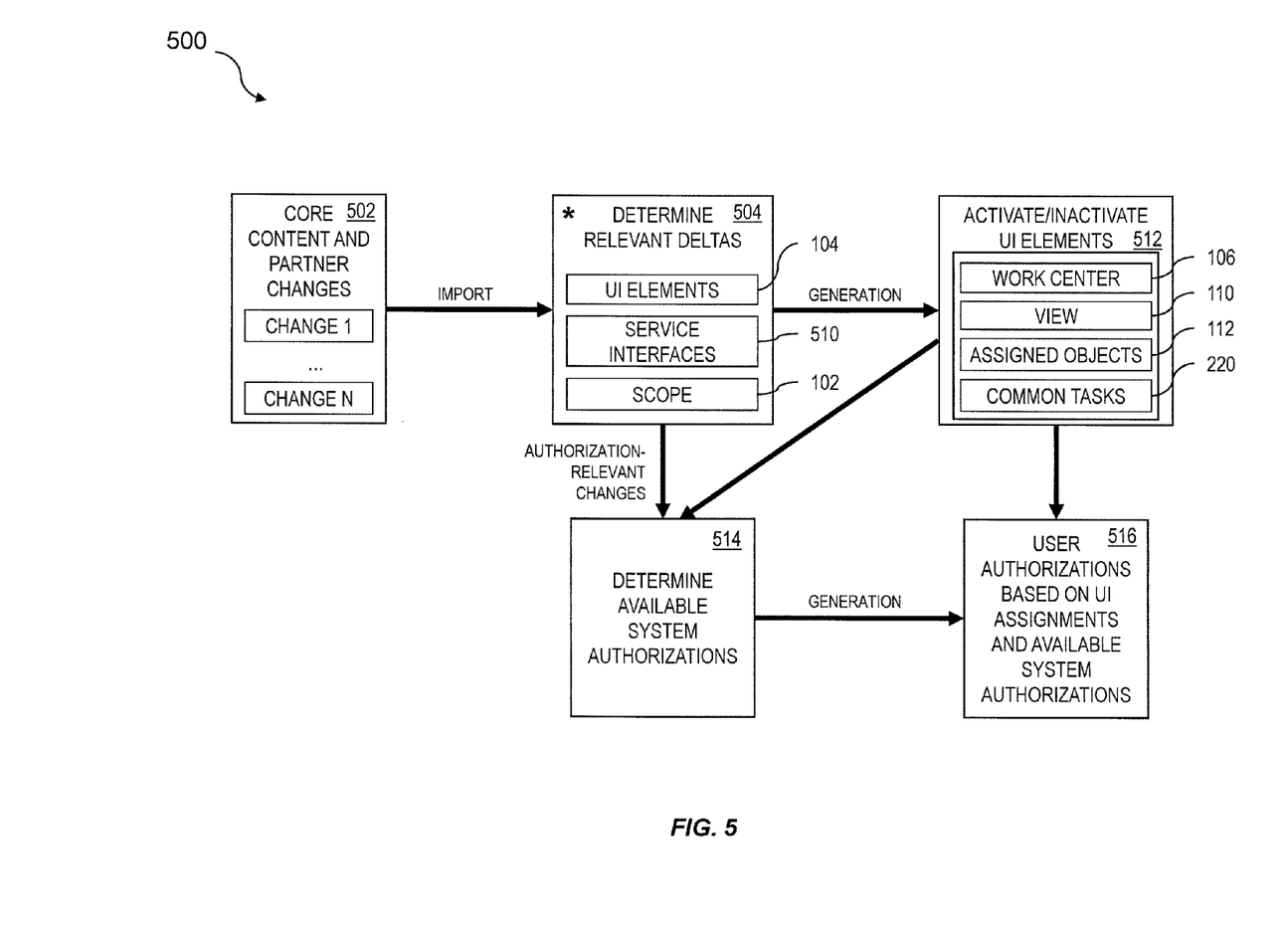
FIG. 5 is a diagram illustrating features of event-based propagation of content changes and determination of a resulting set of user interfaces and authorizations.
Figure 6:
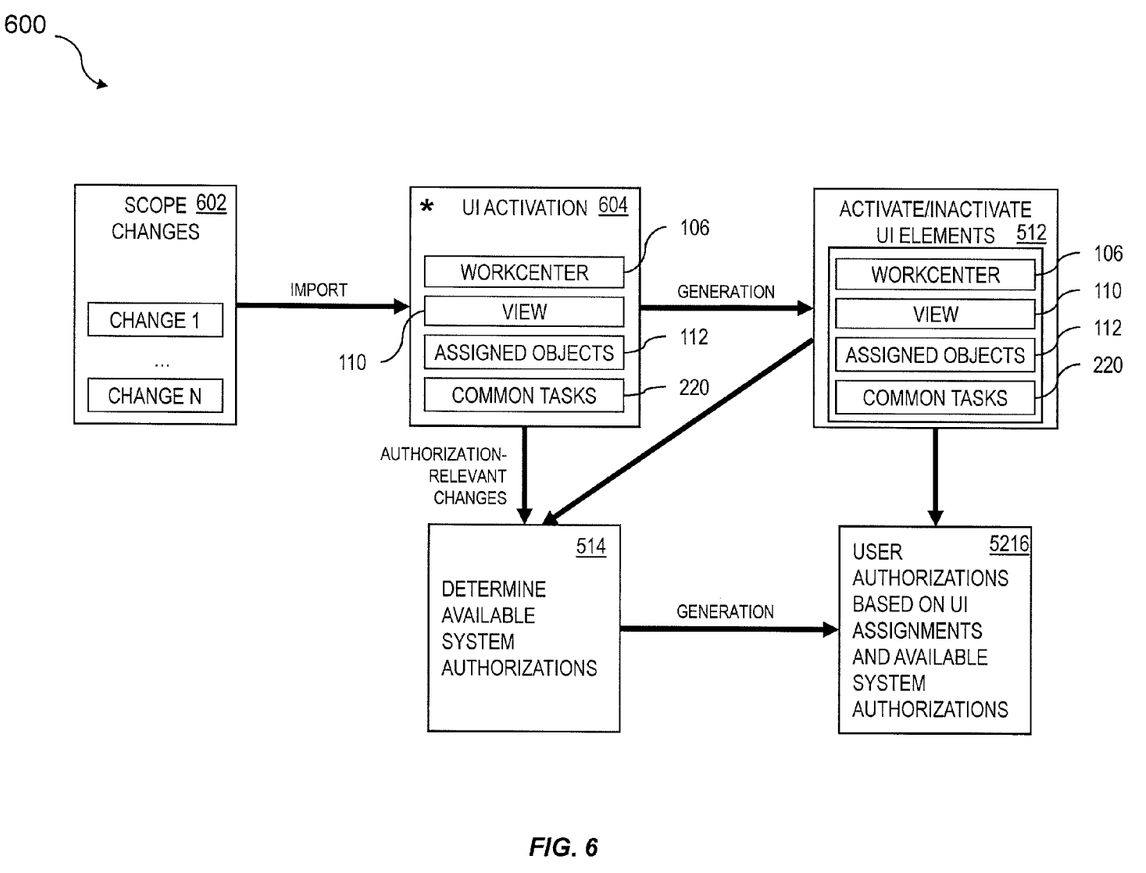
FIG. 6 is a diagram illustrating additional features of event-based propagation of content changes and determination of a resulting set of user interfaces and authorizations.

FIG. 5 and FIG. 6 illustrate features of automatically propagating scope changes and/or other alterations to available content based on a determination of relevant deltas. All of the content need not be regenerated on each scope change or other alteration. In the process diagram 500 of FIG. 5, one or more changes 502 to core content of a software platform and/or to content provided by external software components 320 can be imported, for example to a user interface content generator 322 from a metadata repository 316. At 504, the user interface content generator 322 can determine relevant deltas to the existing user interface. These deltas can affect, for example, user interface elements 104, service interfaces 510, scope elements 102, and the like. The user interface content generator 322 can at 512 then activate or inactivate as needed the appropriate user interface elements 104, such as for example work centers 106, views 108, assigned objects 110, common tasks 112, and the like. To do so, the user interface content generator 322 can determine available system authorizations at 514. User authorizations can be based at 516 on user interface assignments and the available system authorizations. A delta determination algorithm executed by the user interface content generator 322 can activate an auto-repair mode if certain check conditions are met indicating a need to do so.

In the process diagram 600 of FIG. 6, one or more changes 506 to the scope of features and components, etc. to be provided to a user can be received by the user interface content generator 322. The user's user interface can be activated at 604 to display the current user interface elements 104 (e.g.

work centers 106, views 108, assigned objects 110, common tasks 112, and the like). Then, just as in claim 5, the user interface content generator 322 can at 512 activate or inactivate as needed the appropriate user interface elements 104. To do so, the user interface content generator 322 can determine available system authorizations at 514. User authorizations can be based at 516 on user interface assignments and the available system authorizations. A user interface activation algorithm executed by the user interface content generator 322 can activate an auto-repair mode if certain check conditions are met indicating a need to do so.

Figure 7:
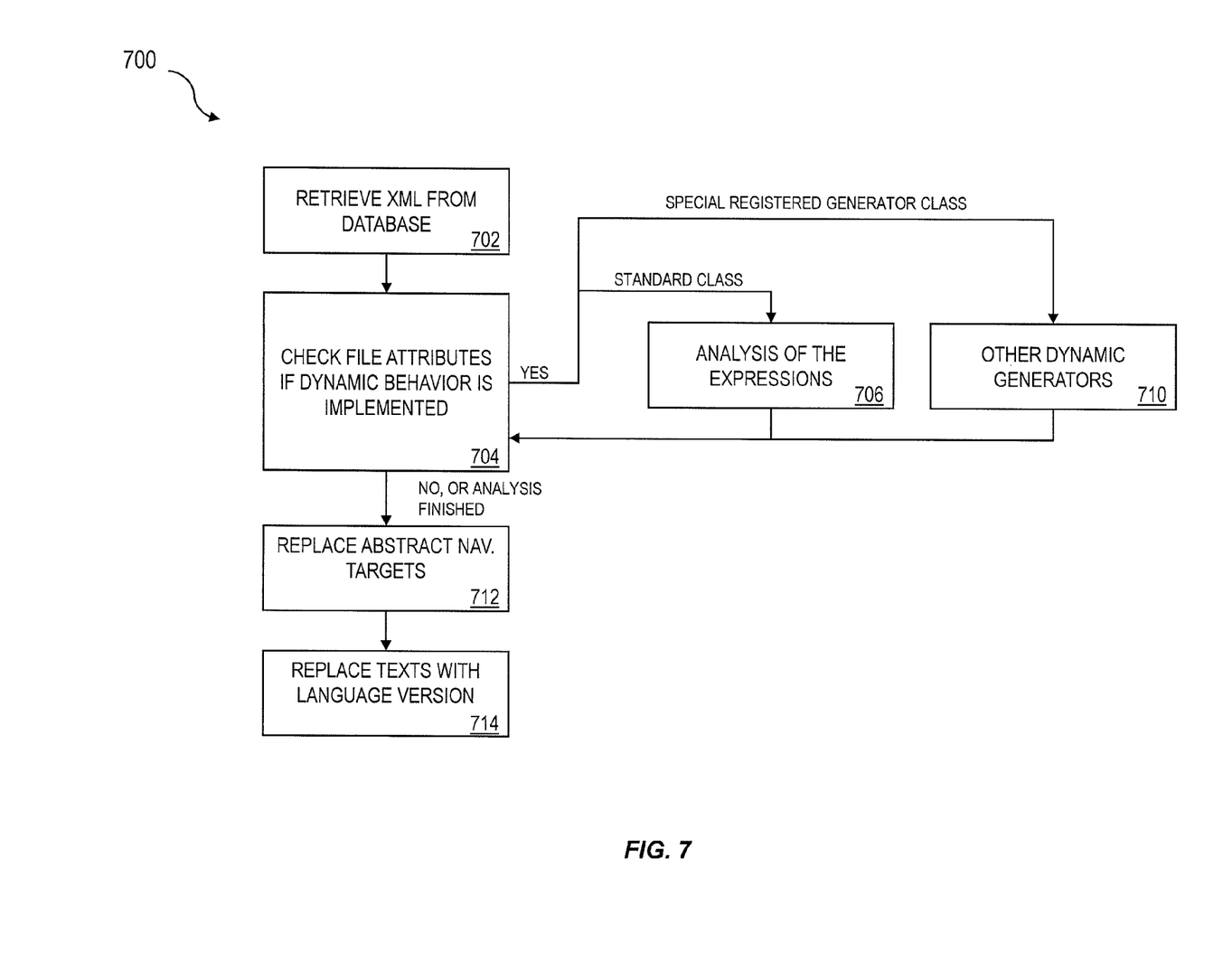
FIG. 7 is a flow chart illustrating logic flows for a dynamic user interface content generator.

The flow chart 700 of FIG. 7 illustrates flow logic of a user interface generator 322 upon receipt of a get load command for user interface content. At 702, content coding, such as for example XML coding, is retrieved from a database, such as for example the metadata repository 316. At 704, a determination is made whether dynamic behavior of the user interface generator 322 is necessary, for example by verifying current file attributes. If dynamic behavior is required, the necessary expressions are analyzed by the user interface generator 322 at 706 if the needed user interface content is part of a standard class or other dynamic generators (for example a generator provided by a developer of an external software component 320) are called at 710 if the needed user interface content is part of a special registered generator class. If dynamic behavior of the user interface generator 322 is not required, at 712 abstract navigation target specifications provided in content definitions can be replaced by active navigation targets. Any other modifications, for example replacement of text according to a user interface language format, etc. are performed at 714.

Figure 8:
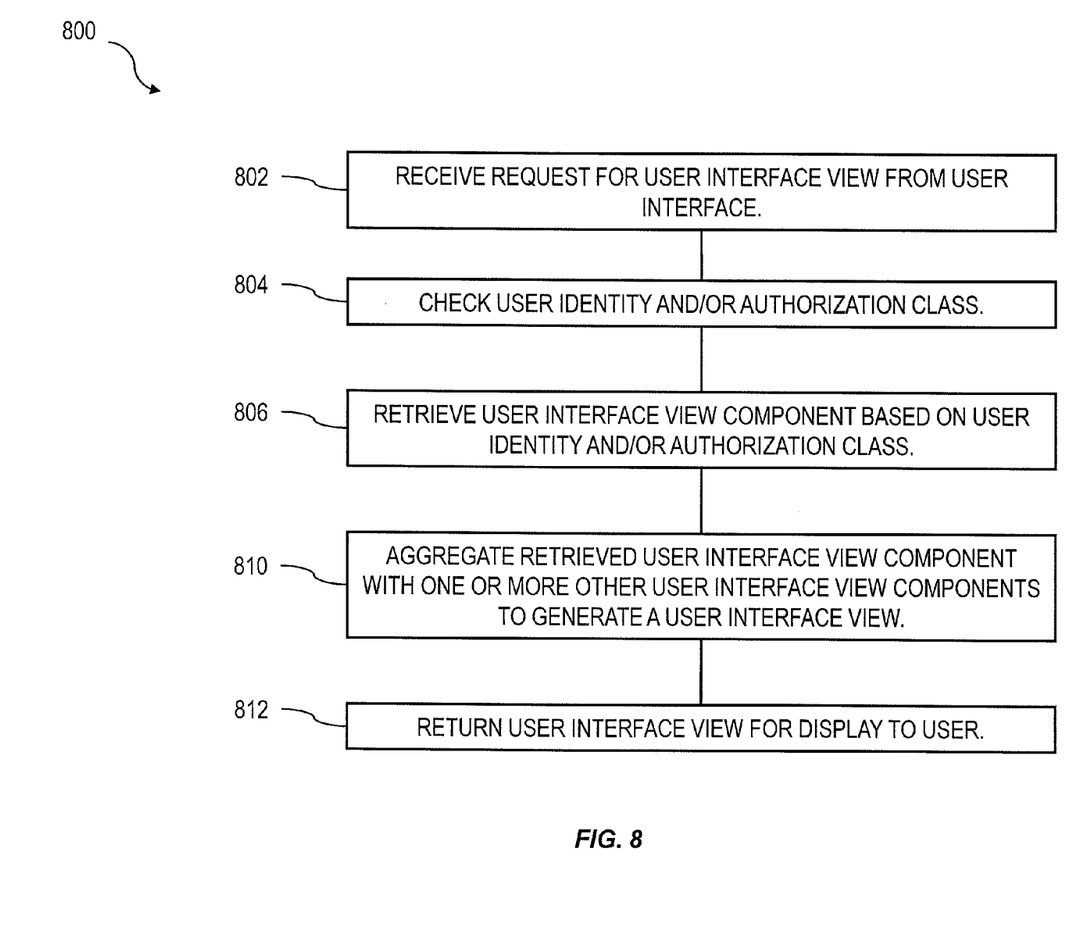
FIG. 8 is a process flow diagram illustrating features of a method.

A method consistent with one or more features of the current subject matter is illustrated in the process flow chart 800 of FIG. 8. At 802, a request for loading of a user interface view is received from a user, for example via user navigation of a user interface at a client machine or on start-up of a software program, architecture, etc. A check of one or more of an identity and an authorization class of the user is performed at 804, for example by a user interface generator 322. Based on the user identity and authorization class, a user interface view component is retrieved at 806. The retrieved user interface view component is aggregated with one or more other user interface view components at 810 to generate the user interface view, which is returned for display to the user at 812, for example via the client machine.

In a system where the content is structured in different hierarchy levels, it can be necessary to aggregate the most important information to a higher level to inform the user about the most important things. For example, in a multi-tenant software architecture that incorporates functionality provider by both the core software platform and other external service providers, there can be three or more hierarchy levels and different kinds of content yet no unique overall aggregation mechanism.

A unified content aggregation mechanism can aggregate user interface metadata exposed at user interface design time over multiple levels in a hosted lean environment. In the flow diagram 900 of FIG. 9, a semantic service aggregator 902, which can in some implementations be part of the user interface generator 322, can perform content aggregation can be to one or more levels, such as for example a control center 904 work center 106, a control center level, a view 108, or one or more other components 906, using a single aggregation mechanism. Metadata can be checked at design time, exposed, and stored in a run time optimized structure 910, which can in some examples be retained within an extracted, tagged, checked, and runtime optimized metadata repository 316 that can be analyzed via a same semantic service 902 to ensure that runtime issues are avoided and also that the same aggregation behavior based on the authorizations and scoping is achieved To determine the appropriate content to aggregate and how it should be aggregated, the semantic service aggregator 902 can use one or more inputs that can include a runtime and/or a work center context 912. Exposed entities from views 108 can be aggregated as a report list pattern (RLP), a work view, an overview, a RSS feed, an aggregated common tasks view, a work center common tasks view based on other views, and the like. An RLP can be a list displaying analytical reports that are available to a work center along with navigation capabilities to launch a specific report.

Figure 9:
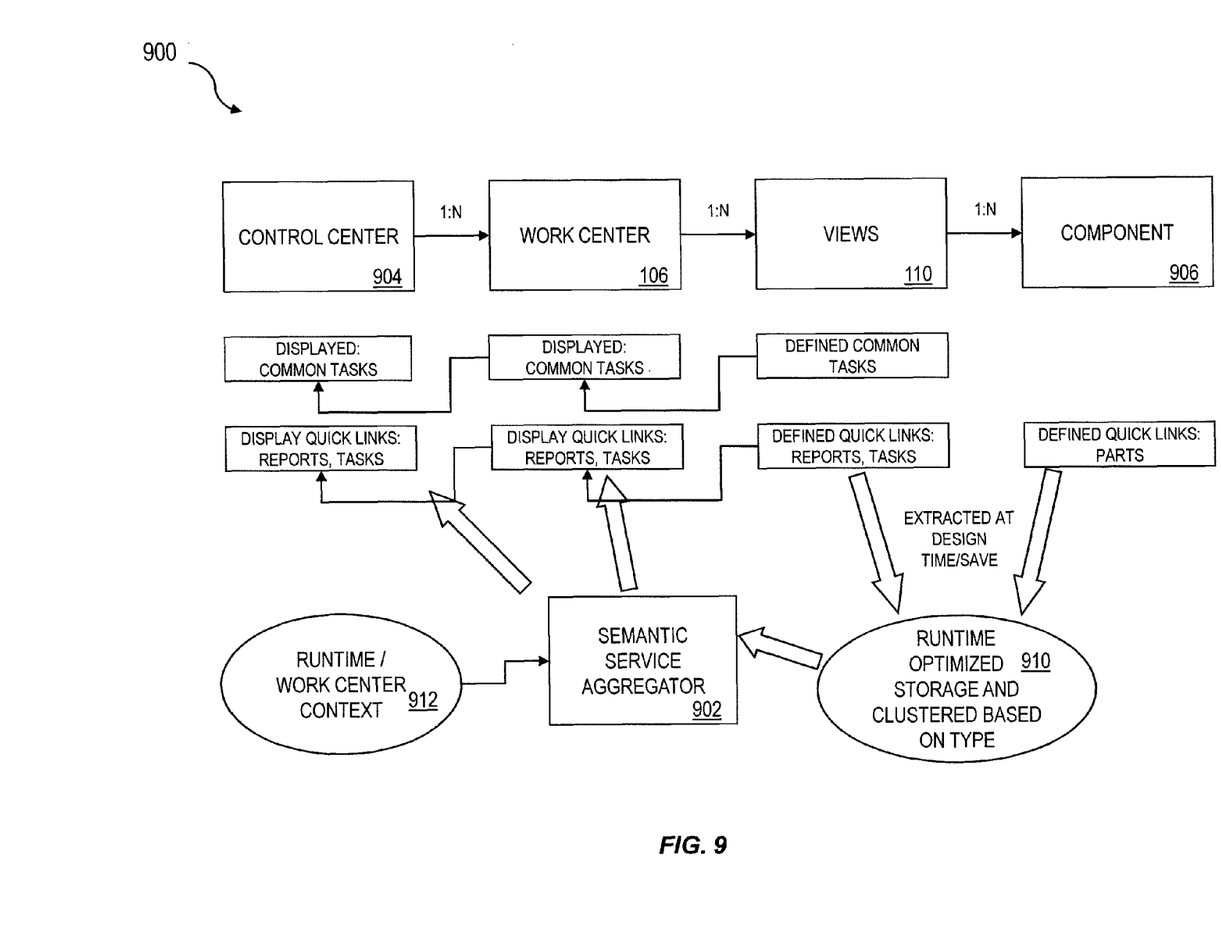
FIG. 9 is a diagram illustrating unified content aggregation based on runtime optimized extracted metadata.

After the save at design time, and alternatively or in addition at runtime if adaptation scenarios are possible by a key user which are influencing the metadata which are the basis for a aggregation, the data can be checked, analyzed and stored in a runtime optimized storage 910. The extracted data can be tagged based on the scenario or context, so that a performance-optimized retrieval can be ensured.

Via the semantic services 902, which can include a set of methods that interpret the user interface metadata, the same aggregation mechanism can be called to retrieve the data for a aggregation scenario. Thus, the same method is used to get all reports for an aggregated reports view as well to get all BTM tasks for a work view (same for other aggregation scenarios). The imported content type which is requested may differ from call to call.

Figure 10:
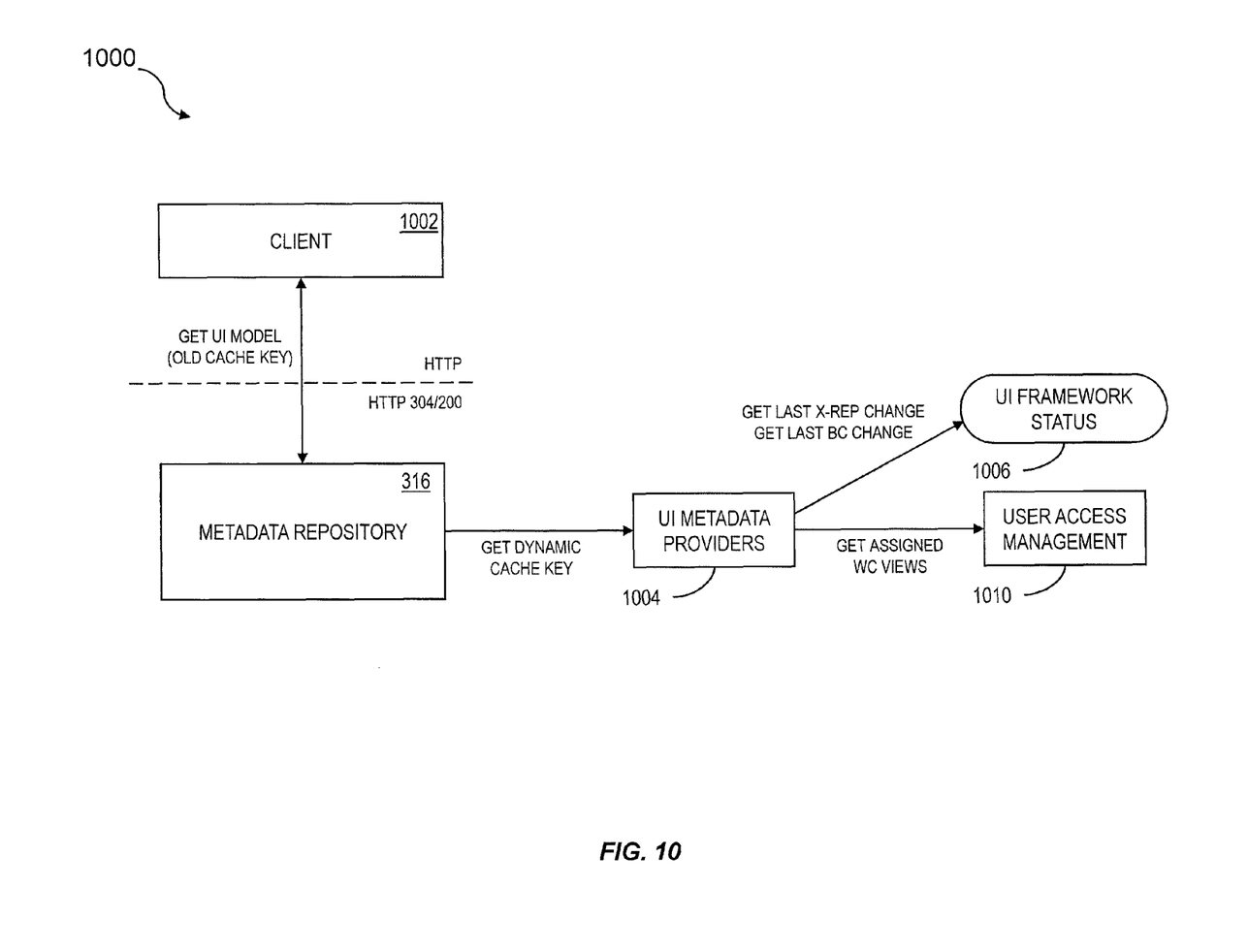
FIG. 10 is a flow diagram illustrating features of cache invalidation.

In another related implementation, a mechanism for invalidating cached user interface metadata is provided. FIG. 10 shows a flow chart 1000 illustrating some features of this aspect of the current subject matter. Because of performance reasons, user interface metadata are typically cached, for example at a client computer 1002. However, due to one or more changes in the underlying content, the cached metadata can become invalidated. If a change in the underlying content results from a change in the core software platform, for example due to a version update, an upgrade, a hot fix, or the like, invalidation of cached metadata can be handled via a time stamp of the like. For example, any cached data with a time stamp older than the date of the core content change can be invalidated.

However, in a complicated, integrated software platform, such as for example a multi-tenant system including both core platform content and content provided by external content providers, a time stamp may not be sufficient. Client side user interface models in such a system can be highly individualized and dependent on several parameters. To ensure that because of content changes or organizational or business data changes to data are not read from the cache anymore an invalidation mechanism/algorithm is required.

As shown in FIG. 10, a cache key can be provided, for example from the metadata repository 316. The cache key can depend on one or more of a user identity, the assigned work center views of the user having the user identity, a current user interface model metadata state, a business configuration state, and the like, and can be obtained from a user interface metadata provider 1004, that can be the core software platform, an external software component 320, or the like. The cache key can decide when the client side user interface model is invalidated in the client cache so that a new model version can be retrieved. Invalidation of the cache key can be determined based on checks of the user interface framework status 1006 and user access management 1010.

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A computer program product comprising a non-transitory machine-readable medium storing instructions that, when executed by at least one programmable processor, cause the at least one programmable processor to perform operations comprising:
   receiving a request for a user interface view from a user interface;
   checking a user identity and a user authorization class for a user of the user interface against a user registry and an authorization class registry, respectively;
   retrieving a user interface view component according to the user identity and the user authorization class;
   analyzing an individual load variant of a user interface model during retrieval of metadata associated with answering of the request;
   generating the user interface view by aggregating the retrieved user interface view component with at least one other user interface view component consistent with the user identity and user authorization class; and
   returning the user interface view for display to the user via the user interface.

2. A computer program product as in claim 1, wherein the retrieving of the user interface view component comprises accessing an assignment for a system scoping element from a scope persistency, the scoping assignment comprising a designation of at least one business content type corresponding to a given scope element, the at least one business content type being selected from a process component, a business process variant type, a business object, and a business feature.

3. A computer program product as in claim 1, wherein the user interface view component comprises at least one of an application view component defined by a specific application as a static user interface model and a generic view component that adapts its metadata based on at least one other available view component.

4. A computer program product as in claim 1, wherein the request for the user interface view occurs automatically in response to a detection of a content change, the content change comprising at least one of installation of a new software version and addition of a new software feature, hot fix, or upgrade of an existing software version that requires at least one of a regeneration of the user authorization class, an adaptation of a scoping decision, and an adaptation of an existing user assignment.

5. A computer program product comprising a non-transitory machine-readable medium storing instructions that, when executed by at least one programmable processor, cause the at least one programmable processor to perform operations comprising:
receiving a request for a user interface view from a user interface;
checking a user identity and a user authorization class for a user of the user interface against a user registry and an authorization class registry, respectively;
retrieving a user interface view component according to the user identity and the user authorization class;
generating the user interface view by aggregating the retrieved user interface view component with at least one other user interface view component consistent with the user identity and user authorization class; and
returning the user interface view for display to the user via the user interface,
wherein the user interface is provided to the user via a client tenant of a multi-tenant system comprising an application server providing access for each of a plurality of organizations to one of a plurality of client tenants, each of the plurality of client tenants comprising a customizable, organization-specific version of a core software platform that also integrates business functionality provided by at least one external software provider, the data repository comprising core software platform content relating to the operation of the core software platform and that is common to all of the plurality of client tenants, system content having a system content format defined by the core software platform and containing system content data that are unique to specific client tenants of the plurality of client tenants, and tenant-specific content items whose tenant-specific content formats and tenant-specific content data are defined by and available to only one of the plurality of client tenants.

6. A computer program product as in claim 5, wherein the operations further comprise:
retrieving a cache key corresponding to a current user interface view active at the user interface, the cache key specifying the user identity and at least one of an assigned work center view of the user, a user interface model metadata state, and business configuration state; and
comparing the cache to a user interface framework status and user access registry comprising current user interface state information for the core software platform, an external service provider, and tenant-specific content metadata associated with the customized version of the core software platform provided to the user by the client tenant.

7. A system comprising:
at least one programmable processor; and
a machine-readable medium storing instructions that, when executed by the at least one programmable processor, cause the at least one programmable processor to perform operations comprising:
receiving a request for a user interface view from a user interface;
checking a user identity and a user authorization class for a user of the user interface against a user registry and an authorization class registry, respectively;
retrieving a user interface view component according to the user identity and the user authorization class;
analyzing an individual load variant of a user interface model during retrieval of metadata associated with answering of the request;
generating the user interface view by aggregating the retrieved user interface view component with at least one other user interface view component consistent with the user identity and user authorization class; and
returning the user interface view for display to the user via the user interface.

8. A system in claim 7, wherein the retrieving of the user interface view component comprises accessing an assignment for a system scoping element from a scope persistency, the scoping assignment comprising a designation of at least one business content type corresponding to a given scope element, the at least one business content type being selected from a process component, a business process variant type, a business object, and a business feature.

9. A system in claim 7, wherein the user interface view component comprises at least one of an application view component defined by a specific application as a static user interface model and a generic view component that adapts its metadata based on at least one other available view component.

10. A system in claim 7, wherein the request for the user interface view occurs automatically in response to a detection of a content change, the content change comprising at least one of installation of a new software version and addition of a new software feature, hot fix, or upgrade of an existing software version that requires at least one of a regeneration of the user authorization class, an adaptation of a scoping decision, and an adaptation of an existing user assignment.

11. A system comprising:
at least one programmable processor; and
a machine-readable medium storing instructions that, when executed by the at least one programmable processor, cause the at least one programmable processor to perform operations comprising:
receiving a request for a user interface view from a user interface;
checking a user identity and a user authorization class for a user of the user interface against a user registry and an authorization class registry, respectively;
retrieving a user interface view component according to the user identity and the user authorization class;
generating the user interface view by aggregating the retrieved user interface view component with at least one other user interface view component consistent with the user identity and user authorization class; and
returning the user interface view for display to the user via the user interface,
wherein the user interface is provided to the user via a client tenant of a multi-tenant system comprising an application server providing access for each of a plurality of organizations to one of a plurality of client tenants, each of the plurality of client tenants comprising a customizable, organization-specific version of a core software platform that also integrates business functionality provided by at least one external software provider, the data repository comprising core software platform content relating to the operation of the core software platform and that is common to all of the plurality of client tenants, system content having a system content format defined by the core software platform and containing system content data that are unique to specific client tenants of the plurality of client tenants, and tenant-specific content items whose tenant-specific content formats and tenant-specific content data are defined by and available to only one of the plurality of client tenants.

12. A system in claim 11, wherein the operations further comprise:
retrieving a cache key corresponding to a current user interface view active at the user interface, the cache key specifying the user identity and at least one of an assigned work center view of the user, a user interface model metadata state, and business configuration state; and
comparing the cache to a user interface framework status and user access registry comprising current user interface state information for the core software platform, an external service provider, and tenant-specific content metadata associated with the customized version of the core software platform provided to the user by the client tenant.

13. A computer-implemented method comprising:
receiving a request for a user interface view from a user interface;
checking a user identity and a user authorization class for a user of the user interface against a user registry and an authorization class registry, respectively;
retrieving a user interface view component according to the user identity and the user authorization class;
analyzing an individual load variant of a user interface model during retrieval of metadata associated with answering of the request;
generating the user interface view by aggregating the retrieved user interface view component with at least one other user interface view component consistent with the user identity and user authorization class; and
returning the user interface view for display to the user via the user interface.

14. A method as in claim 13, wherein the retrieving of the user interface view component comprises accessing an assignment for a system scoping element from a scope persistency, the scoping assignment comprising a designation of at least one business content type corresponding to a given scope element, the at least one business content type being selected from a process component, a business process variant type, a business object, and a business feature.

15. A method as in claim 13, wherein the user interface view component comprises at least one of an application view component defined by a specific application as a static user interface model and a generic view component that adapts its metadata based on at least one other available view component.

16. A method as in claim 13, wherein the request for the user interface view occurs automatically in response to a detection of a content change, the content change comprising at least one of installation of a new software version and addition of a new software feature, hot fix, or upgrade of an existing software version that requires at least one of a regeneration of the user authorization class, an adaptation of a scoping decision, and an adaptation of an existing user assignment.

17. A computer-implemented method as in claim 13, wherein at least one of the receiving, the checking, the retrieving, the generating, and the returning is performed by at least one programmable processor.

18. A computer-implemented method comprising:
receiving a request for a user interface view from a user interface;
checking a user identity and a user authorization class for a user of the user interface against a user registry and an authorization class registry, respectively;
retrieving a user interface view component according to the user identity and the user authorization class;
generating the user interface view by aggregating the retrieved user interface view component with at least one other user interface view component consistent with the user identity and user authorization class; and
returning the user interface view for display to the user via the user interface,
wherein the user interface is provided to the user via a client tenant of a multi-tenant system comprising an application server providing access for each of a plurality of organizations to one of a plurality of client tenants, each of the plurality of client tenants comprising a customizable, organization-specific version of a core software platform that also integrates business functionality provided by at least one external software provider, the data repository comprising core software platform content relating to the operation of the core software platform and that is common to all of the plurality of client tenants, system content having a system content format defined by the core software platform and containing system content data that are unique to specific client tenants of the plurality of client tenants, and tenant-specific content items whose tenant-specific content formats and tenant-specific content data are defined by and available to only one of the plurality of client tenants.

* * * * *